United States Patent [19]

Beck

[11] 4,015,781
[45] Apr. 5, 1977

[54] CONVERSION OF PLASTIC WASTE INTO EXTRUDABLE PELLETS

[76] Inventor: Erich Beck, Am See 29, 652 Worms - Weinsheim, Germany

[22] Filed: July 22, 1974

[21] Appl. No.: 490,873

[30] Foreign Application Priority Data

July 4, 1974 Germany ............................ 2432495
July 4, 1974 Germany ............................ 2432494

[52] U.S. Cl. ............................................. 241/46.11
[51] Int. Cl.$^2$ .......................................... B02C 23/36
[58] Field of Search ...................... 241/46.11, 46.17

[56] References Cited

UNITED STATES PATENTS

| | | | |
|---|---|---|---|
| 2,122,217 | 6/1938 | Sisson ........................... | 241/46.17 X |
| 2,954,174 | 9/1960 | Polleys ......................... | 241/46.17 X |
| 3,339,851 | 9/1967 | Felton et al. ................... | 241/46.17 |
| 3,486,702 | 12/1969 | Kmeco ........................... | 241/46.17 |
| 3,493,022 | 2/1970 | Mantelet ........................ | 241/199.12 |
| 3,510,067 | 5/1970 | Beck et al. ..................... | 241/17 |
| 3,620,460 | 11/1971 | Hankes .......................... | 241/46.11 |
| 3,833,178 | 9/1974 | Beck ............................ | 241/46.11 |

*Primary Examiner*—Granville Y. Custer, Jr.
*Attorney, Agent, or Firm*—Theodore Hafner

[57] ABSTRACT

The invention relates to an apparatus for the conversion of plastic waste into usable material, in which a number of rotating knives are arranged at the bottom of a cylindrical space receiving the plastic waste, and in which by deflecting means arranged along the periphery of said space, the plastic waste, while being cut and circulated by the rotating knives, is directed back into the path of said rotating knives.

12 Claims, 6 Drawing Figures

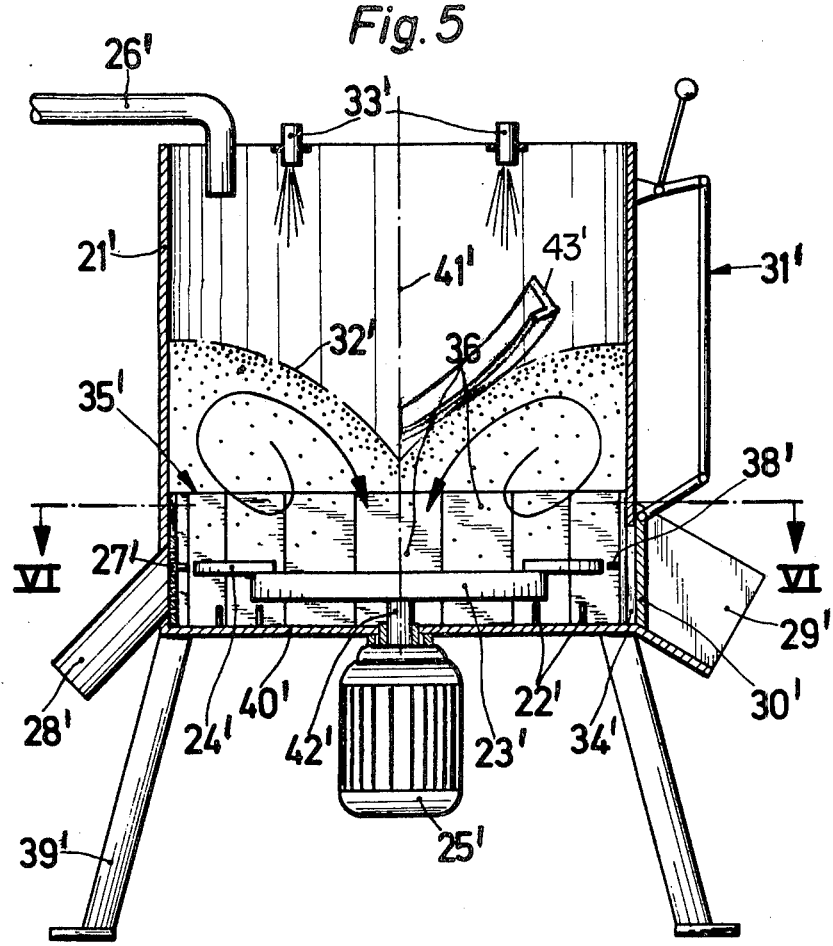
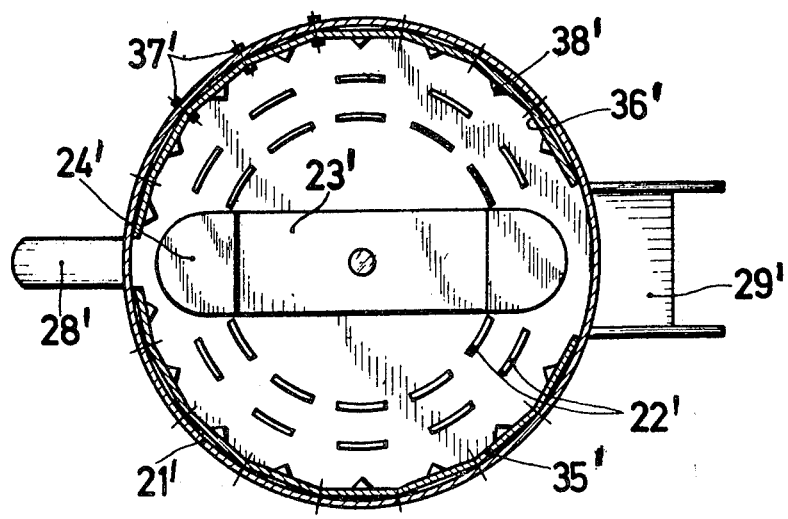

CONVERSION OF PLASTIC WASTE INTO EXTRUDABLE PELLETS

One of the objects of the invention relates to an apparatus for the conversion of plastic waste into flowing or extrudable granulate especially from foils and blown parts, comprising an upright container provided with inlet and outlet; and arranged in the lower region of said container, at least one rotatable beating, comminution tool for the comminution, heating and agglomeration of the waste. Such apparatus are known from German Pats. Nos. 1,679,834 and 2,005,360, and are introduced into the market under the name of Zerglomat (Registered Trade Mark) and Wash-Zerglomat, (Registered Trade Mark) respectively.

Into this apparatus, the waste is thrown, uncomminuted, thereafter the comminution work takes place and if necessary simultaneously a washing process occurs. During the comminution, the waste is heated and agglomerated, densified and, if necessary, cooled by the injection of a cooling medium into the container.

During comminution, a relatively uniform mass of cuttings is formed which moves in the container in a circular fashion. This movement results from the superimposition of a rotational movement of the waste stuff due to the rotation of the beating comminution tool, upon a circular movement within a vertically extending plane through the container. This latter circular movement is due to the fact that the beating comminution tool throws the waste stuff from an inner position radially to the outside so that, arriving at the inner wall of the container, it is pressed upwardly, and at a certain height on the inner wall of the container (which among others depends upon the quantity of the waste and the rotational velocity of the comminution tool) is carried radially to the inside and downward. In this position the waste is again caught by the rotating beating comminution tool. In this way, a uniform circulation takes place in the form of a whirlpool as it is already known from the operation of mixers. With increasing heating-up of the waste stuff, the flakes, already partially agglomerated, stick to each other forming blocks and clumps. As a result, the motion of the waste stuff, as above described for the comminution process, will be impaired. At the same time, the uniformity of the further heating of the waste stuff will be impeded and even disturbed. The whirlpool of the material which at the outset is symmetrical with respect to a circle perpendicular to the container axis, assumes the form of a paraboloidal surface rotating around the container axis, extending radially to the inside of the container forming an overhanging annular body.

These phenomena cause the waste stuff to climb high along the inner wall of the container. At the same time, at this point, the waste stuff may form so large an overhang as to drop irregularly into the lower space of the container. In special cases, for example, upon excessive injection of waste, it is even possible that such a large overhang of material will reach the axis of the container. This means that with the overhang of the material growing from all directions towards the center, the mass may close at the center and stick together. This produces an occasional downfall of large blocks of overhang, which in return causes a considerable disturbance of the process, and sometimes even leads to a solid bridge or dome formation. As a result the beater comminution tool may be running idle.

One of the objects of the invention is to prevent the disturbing phenomena described above, and the irregular dropping of the overhang, and especially the formation of such an overhang.

This is achieved by providing at least one deflecting surface along the inner wall of the container above the beater comminution tool.

At the outset, the flow of material along the inner wall of the container will be disturbed The material pushed-up along the container wall is deflected radially to the inside, and at the right moment, so that in accordance with the invention, an ideal circular motion is assured throughout the entire working phase of the apparatus. This applies even in the case of the injection of large quantities of waste material.

A more specific object of the invention relates to the conversion of plastic waste, especially foils and blown parts, into a flowing granulate by means of a rotary symmetrical upright container with inlet and outlet, having arranged in its lower portion and around its axis, a beating comminution tool for comminuting, heating and agglomerating the waste. Along the container wall and within the path of the beater arms counter action tools are provided impeding the movement of the waste. Such apparatus are known from German patent specifications Nos. 1,679,834 (U.S. Pat. Nos. 3,510,067 and 3,685,748) and 2,005,360 (U.S. Pat. Nos. 3,717,307). Usually the counter action tools impeding the movement of the waste, in these known apparatus, are in the form of a large number of stationary knives attached to the wall of the container and preferably radially adjustable.

One of the objects of the invention is to reduce the expense for the multitude of stationary knives; and in accordance with the invention, a portion of the inner container wall, arranged in the path of the beating comminution tool, is formed as a sheet-like structure with polygonal cross section; the individual planes of the polygon serving as counter action tools.

The number of the polygon planes is preferably relatively high, for example 25, one plane joining another. If necessary when using the apparatus, according to German Pat. No. 2,005,360, in the region of the output opening as well as in the region of the output sieve, the polygon planes are ommitted.

During the comminution, the waste is caught by the beater arms and pressed against the inner wall of the container, whereby on each plane of the polygon from its edge to its center (seen in cross section) the distance between plane and beater decreases. This causes an impediment in the movement of the waste, and combined with the effect of the beater arms carrying, for example, cutting knives, this produces a comminution of the waste. Thus, the known stationary knives are replaced by the specific shaping of the container wall which exists there in any case; at the same time, expense is reduced.

Another object of the invention is to reduce the wear produced in the path of the beater arms, due to the friction of the waste along the container wall. This occurs especially, when the waste to be converted, contains abrasive components, for example, fill bodies or sand.

In one embodiment of this aspect of the invention, therefore, a portion of the container wall is made of material less wearing then the rest of the container. This, however, while being effective, does not represent an optimal solution. In an improvement of the invention, therefore, the polygonally shaped container wall is formed as a separate part of the container.

While in accordance with prior art, in case of the wearing-out of the wall, the entire container would have to be replaced, in accordance with this embodiment of the invention, merely a new part is inserted.

As a further improvement, this new container part is shaped as an annular insert, consisting of one or several arrays, one on top of the other. This insert is placed into the container and attached thereto, and if in accordance with the invention, the insert is made entirely of relatively low-wearing material, replacement of the insert will be required only rarely.

It is also considered useful to manufacture the insert from a metal sheet bent into a polygonal shape. Alternatively, the individual planes may be welded into a polygonal ring.

These and other objects of the invention will be more fully apparent from the drawings enclosed herein, and in which:

FIG. 5 represents still another aspect of the invention in the form of an apparatus shown in longitudinal section, and provided with a device to add washing material, and FIG. 6 represents a cross section of the interior corresponding to line VI—IV in FIG. 5.

Figure 1:
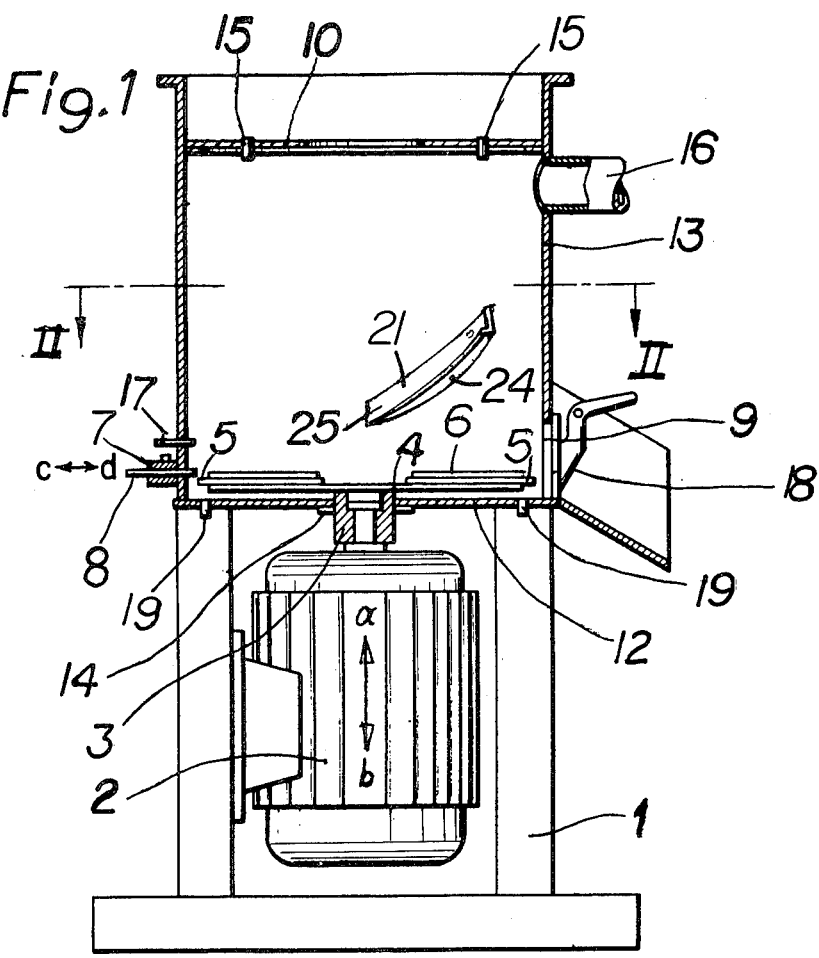
FIG. 1 represent an apparatus embodying one aspect of the invention, in partial longitudinal section, and FIG. 2 a cross section of the interior corresponding to line II—II in FIG. 1.
Figure 2:
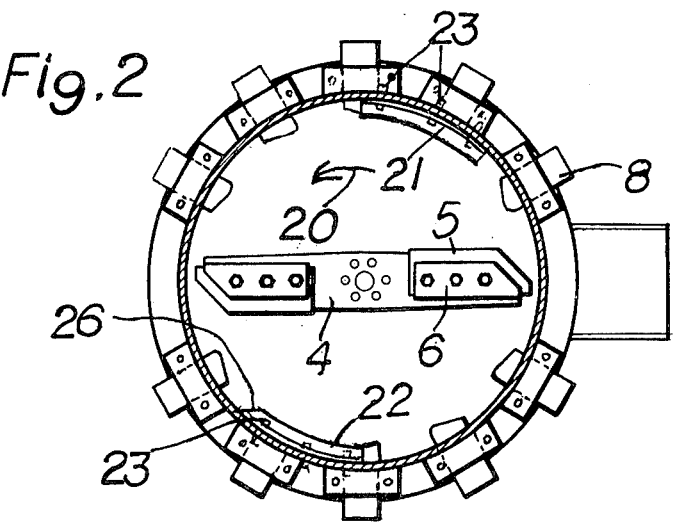

In the embodiment shown in FIGS. 1 and 2, base structure 1 supports a cylindrical container 13 in which a driving motor 2 is arranged axially adjustable in direction $a-b$. Hub 3 extends through a seal 14 and container bottom 12, into the interior of the container. Beating comminution tool 4 is attached to hub 3, rotating when operated, in the direction of arrow 20. Tool 4 has beating edges 5 attached by means of clamping plates 6.

At about the same height as the circulating beater comminution tool 4, there are arranged along the circumference of the cylindrical part of container 13, a number of stationary counter action tools or comminution organs 8 in the form of platlets or bolts. These bolts are radially adjustable in the direction $c-d$, and they can be fixed by means of clamping pieces 7 in any desirable position.

The cap 10 of container 13 is provided with an input opening 11 which can be closed if required. Its diameter may not exceed a predetermined size to prevent plastic parts from escaping when they are being pushed up by the beating effect during comminution and agglomeration.

The cylindrical part of container 13 has an outlet 9 arranged immediately above the bottom of the container. Outlet 9 can be closed by a cover 18 (not shown in FIG. 2 which mainly shows the interior of the apparatus). Several nozzles 15 serve to permit adding of cooling liquid. Other nozzles 19 in container bottom 12 serve for the injection of a cooling gas.

Removal of vapors during the cooling process is effected through outlet 16 connected to a ventilator. In order to permit observation of the agglomeration process, a thermometer 17 is arranged dipping into the plastic mass. By means of this thermometer, the termination of the agglomeration process can be automatically initiated through the injection of a cooling liquid and/or a cooling gas.

As apparent from FIG. 2, deflection pieces 21 and 22 are attached by means of screws 23 to the wall of container 13, extending lengthwise over about a quarter of the circumference of container 13. Deflecting pieces 21 and 22 consist of L-profiled rods which are bent helicoidally to follow the shape of the container wall, extending with their free legs upward, and at an angle of about 40° in the direction of rotation as indicated by arrow 20. They are so attached to the wall of the container as to be inclined downwardly. This results in deflecting surface 24 being arranged with its lower end 25 at a distance of about 20 mm above the beating edge. Deflecting surface 24 serves, in the first instance, to separate the plastic mass pushing up along the inner wall of container 13, from that wall, and thereafter to guide it radially to the center of container 13.

The oblique arrangement of the deflecting pieces, in addition to being advantageous process-wise, also permits in a simple way an adjustment of height whereby the holes already provided in deflecting pieces 21, 22 for screws 23, can be again utilized without requiring additional holes.

In accordance with FIG. 2 deflecting piece 22 is modified in that the nearest portion in the direction of rotation of arrow 20 is provided with a transition edge extending from the inner wall of container 13. In certain cases, this sort of shaping contributes to a more uniform operation of the apparatus.

Figure 3:
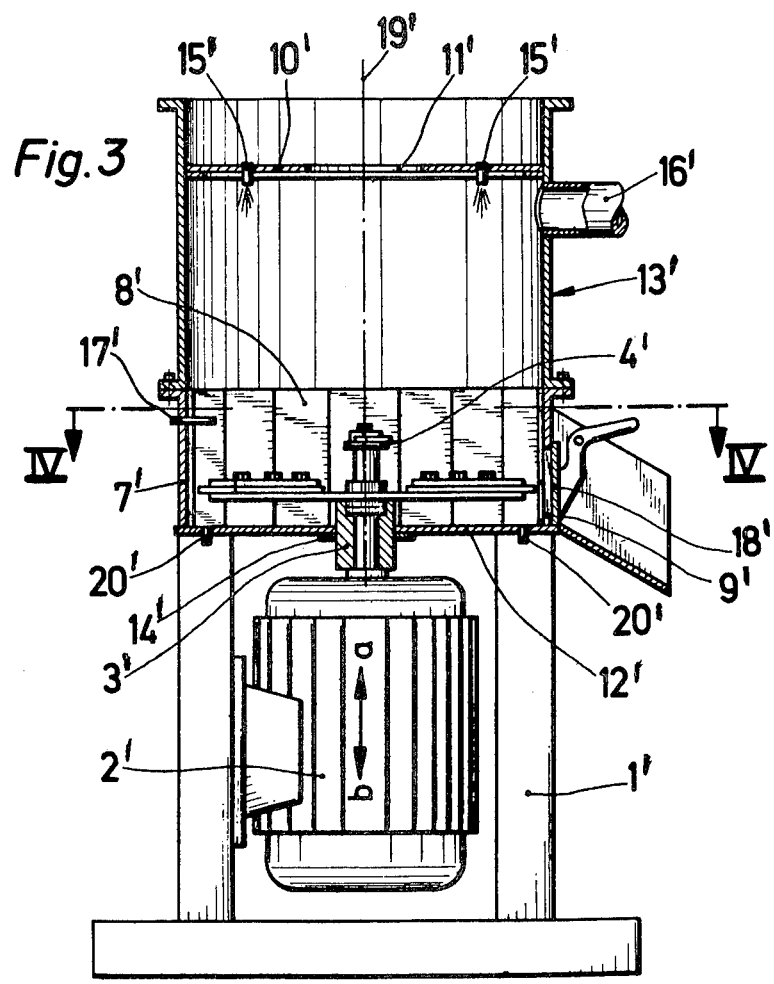
FIG. 3 represents another apparatus partially in longitudinal section, and embodying another aspect of the invention.
Figure 4:
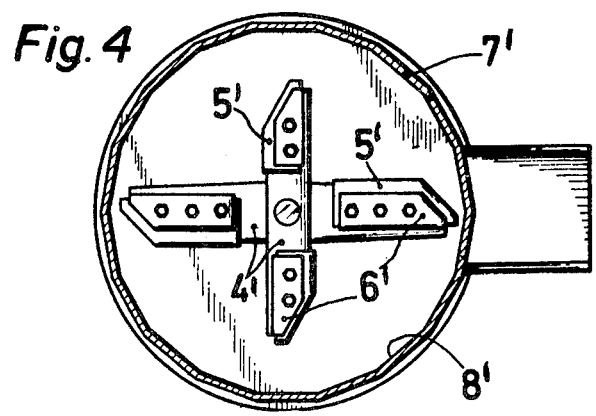
FIG. 4 shows a cross section of the interior corresponding to line IV—IV in FIG. 3.

In the embodiment of the invention shown in FIGS. 3 and 4 again a cylindrical container 13' is seen resting upon a base 1', in which a driving motor 2' is arranged axially adjustable in direction of line $a-b$. Hub 3' reaches through seal 14' and bottom 12' into its interior. The comminuting elements attached to hub 3' of the motor shaft are shaped in the form of beater arms 4' arranged in two planes. Arms 4' carry beating edges 5' attached by means of steel clamps 6'.

The lower region of container 13' containing the counter action tools, is formed as a separate container part 7' which is secured to the remaining part of the container as well as with its bottom 12'. Part 7' of the container consists of a sheet metal part shaped in the form of a polygon with planes 8' being arranged angularly with respect to each other, and disposed at such a distance from the axis 19' of the container that the distance between the relatively longer (lower) beater arms 4' and the center of planes 8' (seen in cross section) produces a good comminution effect. Corrections or modifications of this distance can be effected through adjustment or replacement of beater edges 5'.

The cover 10' of the container is provided with an input opening 11' which can be closed if required. The diameter of opening 11' must not exceed a predetermined size to prevent the exit of material pushed up by the beater effect occurring during comminution and agglomeration. An outlet 9' is provided on the cylindrical portion of container 13' immediately above the container bottom 12'. It can be closed through a cover 18' (not shown in FIG. 4 which mainly shows the interior of the apparatus). For the addition of cooling liquid, injection nozzles 15' are arranged in container cover 10'. Corresponding nozzles 20' are provided in container bottom 12' for the injection of a cooling gas.

In order to permit removal of the vapors produced during the cooling process, an outlet 16' is provided to which a ventilator is connected. For the observation of the agglomeration process a thermometer 17' is arranged to dip into the plastic mass. By means of this thermometer, at the termination of the agglomeration process, the infusion of cooling liquid and/or the injection of a cooling gas is automatically initiated.

With this type of apparatus, thermoplastic waste can be converted into extrudable pellets, for example, by proceeding in the following manner.

A cylindrical container of a diameter of about 1.1 m and a height of about 1.5 m is charged up with about 75 kg of polyethylene foil waste. The comminution and cutting-up of the foil waste, occurs at a circumferential velocity of about 70 m/sec. of the beater arms reaching into the proximity of fixed comminution planes 8'. The duration of this comminution process is about 4 minutes. The beater arms are not permitted to run 3 further minutes. As a result, the mechanical energy consumed, is converted to a great extent into friction heat whereby the foil waste is densified and agglomerated. In the course of the further running of the beater arms, about 1.5 liter of water is rapidly injected. Then, after about 1 minute, the solidified and cooled agglomerate which does not tend anymore to bake, is taken out from the container.

In the embodiment illustrated in FIGS. 5 and 6, a round container 21' is shown arranged vertically on a base 39'. Container 21' is provided at its bottom 40' with stationary knives 22'. Along these knives are moving the rotating beating arms 23' mounted on the shaft 42' of an electromotor 25' attached to bottom 40' of container 21'. Beating arms 23' are provided with beating edges 24' on opposite ends thereof.

In the lower region of container 21' serving as counter action tool, two polygon ring parts 35' are mounted, extending from the bottom 40' of the container 21' to a space above beating edges 24'. They are attached by screws 37' to container 21'. The two polygon ring parts 35' are made of relatively low-wearing sheet metal through a corresponding shaping process. They form planes 36' arranged angularly with respect to each other, in a manner similar to that discussed with respect to FIGS. 3 and 4, with the modification, however, that each plane 36' at its center (seen in cross section) and at the height of the beating edges 24' is provided with a triangular knife piece 38' pointing toward the axis 41' of the container.

Knife pieces 38' increase the cutting effect of the comminution arms 23' which is useful for certain types of waste. They relieve, at the same time, the function of planes 36' as counter action tools with respect to the beating arms 23'. This results into a longer life for the polygon ring parts 36'.

Inlet tube 26' permits the injection of a washing liquid into the open upper part of container 21'. The outflow of the washing liquid, and of any undesired material, is effected through outflow tube 28' provided with a sieve 27' (omitted from the cross section of FIG. 6). A further outflow tube 29' which can be closed through an actuation device 31' by means of cap 30' (both omitted from the cross section of FIG. 6) permits the removal of the granulated plastic.

Dirty plastic waste to be treated in accordance with the invention, will be thrown into container 21' uncomminuted and while the comminution arms 23' are rotating. At the same time, washing liquid is injected through inlet tube 26'. This liquid penetrates the waste while being already more or less comminuted. The dirt particles and the washing liquid are taken off at the outlet tube 28' sieve plate 27' prevents the outflow of plastic parts which have already been comminuted.

The duration of the washing process depends upon the degree of soiling. As soon as the washing liquid is seen to be running clear, the further addition of this liquid is interrupted while the comminution arms 23' continue circulating. Thus the liquid adhering to the plastic parts, will be removed largely as a result of the centrifugal effect of the plastic parts which rotate at the same time as the liquid does, and form a surface corresponding to line 32'. This results in a rapid drying due to the evaporation of the liquid which in turn, is caused by the plastic parts being heated through the work of comminution organs 23', 24'.

Thereafter, the plastic parts remain further exposed to circulating comminution arms 23' until densification and agglomeration occur. It may be useful, toward the end of the last process step, to inject briefly a cooling liquid through nozzles 33'. Thereafter, the solidified and cooled agglomerate, not tending anymore to bake, is removed through outflow tube 29', and it can now be used for further treatment by calanders, extruders, etc.

The invention is not limited to the examples or embodiments described or illustrated, nor to the components or the combination of components described or shown. More specifically, in accordance with the invention, it is feasible to combine any of the features shown and described, with any of the other features shown and described, without departing from the scope of this disclosure.

More particularly, it is further feasible, to combine several of the embodiments of the invention, especially the deflecting means arranged to deflect the plastic waste substantially downward in a vertical plane, with the deflecting menas or wear-subjected elements arranged to deflect the plastic waste substantially in a horizantal plane and in a direction toward the inside of the apparatus, thereby causing a far reaching intermingling and homogenization of the output, all this also without departing from the scope of this disclosure.

Such a combination is exemplified, and schematically illustrated in FIGS. 5 and 6, which in addition to polygonal work piece 35' facing the beater comminution tool, also shows deflection piece 43' operating in the space above the beater comminution tool as described in FIGS. 1 and 2 with respect to parts 21, 22.

I claim:
1. In an apparatus for the conversion of plastic waste into usable material, means including an upright wall forming a cylindrical working space, at least one rotatable knife arranged at the bottom of said space coaxial therewith, and counter action tools arranged along the wall at the bottom of said space, facing said knife, means above said knife at the top of said space for charging said space with plastic waste; and elongated means attached to said wall at a predetermined height substantially above, and separated from said counter action tools, and projecting from said wall at a distance small against the radius of said wall; said elongated means extending at said height circumferentially and in the direction of its elongation, at least along a portion of the periphery of said wall; and while said waste is being cut and circulated by said knife and thereby rising along the wall, reflecting said rising waste at said height back toward the path of said knife.

2. Apparatus according to claim 1, wherein said elongated means are arranged to point substantually downward into a direction forming an angle with the vertical.

3. Apparatus according to claim 1, wherein said elongated means have a guiding surface projecting perpendicularly from the circumference into the space, for a distance which is small against the radius of said space, extending at the same time along the circumference for a distance of the order of one eighth of said circumference in a downward direction.

4. Apparatus according to claim 1, wherein said counter action tools consist of a number of equal, substantially planary panels arranged in a continuous circle, one angularly joined to another along the bottom of the wall and along its circumference the planes of said panels extending substantially parallel to the axis of the space; each planary panel extending along said circumference as well as upward and downward to the bottom from a center point facing said knife while rotating; each panel thus forming a planary surface perpendicular to the radial extension of the knife, and also forming an acute angle with the circumference to deflect the plastic waste driven by the knife against it, back into the path of said knife.

5. Apparatus for the conversion of plastic waste into a flowing granulate, comprising a cylindrical container with inlet and outlet; and in its lower portion arranged around the axis of the container, a beating comminution tool with radial arms circulating to comminute, heat and agglomerate the waste, counter action tools being arranged along the wall of the container, facing said beating comminution tool; and consisting of a number of plane elements with sides angularly joined to each other, forming at least one sheet-like structure with a polygon-like cross section; each element extending along the circumference of the wall as well as upward and downward from a center point, thus forming a plane surface perpendicular to the radial arms when passing the center point, and also forming an acute angle with the circumference so that the plastic waste driven by the circulating tool against a plane element will be guided back into the path of said circulating tool.

6. Apparatus according to claim 5, wherein said sheet-like structure — looked at cross-sectionally — includes a number of planary surfaces, having central sections carrying polygontype knife portions projecting from the structure into the direction of the container axis.

7. In an apparatus for the conversion of plastic waste into a flowing granulate, a substantially cylindrical upright container having inlet and outlet, and in its bottom space coaxial with said container, a beating comminution tool arranged to circulate for the comminution, heating and agglomeration of the waste; and counter action tools arranged along the wall of said container within the operating range of the beating comminution tool thereby impeding the movement of said waste along the periphery of the bottom of the wall while permitting its rise upward along the wall, and at least one elongated element attached to the inside of the container wall in a position at a predetermined height substantially above and separate from said counter action tools; said elongated element having a surface facing downward and extending peripherally along a predetermined portion of said wall, and projecting from said wall to the inside of said container for a distance which is small against the radius of said wall, thereby preventing the waste from rising upward along the wall beyond said predetermined height.

8. Apparatus according to claim 7, wherein said elongated element is arranged perpendicular to the inner wall of said container, downwardly inclined in the direction of rotation of said beating comminution tool at an angle of about 35° to 45° with respect to the axis of the container.

9. Apparatus according to claim 7, wherein said elongated element comprises a helicoidally wound rod, in the form of an L-profile, having one surface attached to the wall, and another surface forming said downward facing surface.

10. Apparauts according to claim 7, wherein the lower end of said downward facing surface is arranged at a distance of about 10 to 30 mm above the position of said beating comminution tool.

11. Apparatus according to claim 7, wherein the projection onto a horizontal plane, of the length of said surface amounts to about a quarter of the circumference of the container.

12. Apparatus according to claim 7, wherein said downward facing surface has an end portion gradually increasing in width, from a point where it originates at the inner wall of the container said end portion being disposed in a region of said surface, which — seen in the direction of rotation of the beating comminution tool — is nearest.

* * * * *